Nov. 28, 1950          L. E. SHAW          2,532,124

VARIABLE SPEED POWER TRANSMISSION

Filed June 15, 1948          3 Sheets-Sheet 1

LOUIS EATON SHAW
*INVENTOR.*

BY *Robt Meyer*
     *Attorney*

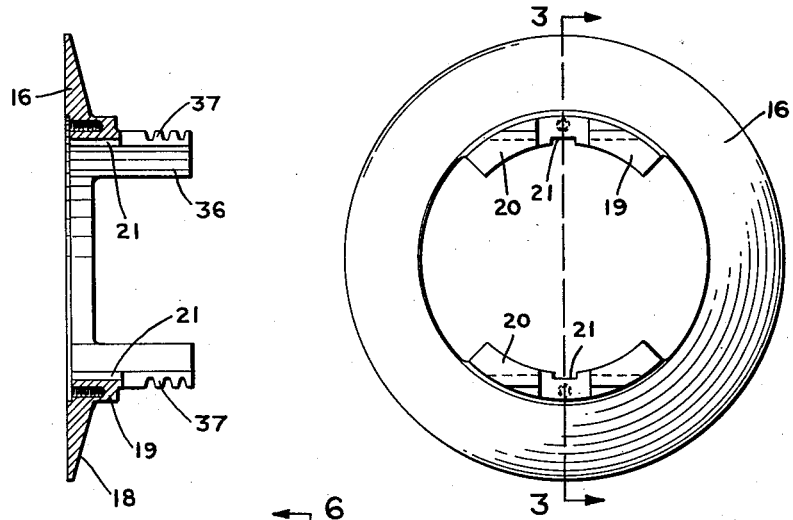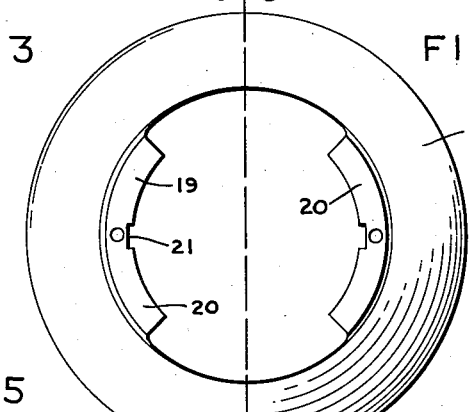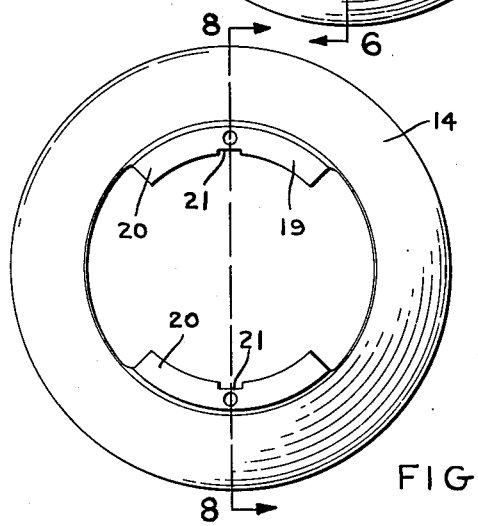

LOUIS EATON SHAW
INVENTOR.

Patented Nov. 28, 1950

2,532,124

UNITED STATES PATENT OFFICE 2,532,124

VARIABLE SPEED POWER TRANSMISSION

Louis Eaton Shaw, East Orange, N. J.

Application June 15, 1948, Serial No. 33,127

7 Claims. (Cl. 74—230.17)

This invention relates to variable speed power transmissions and more particularly to a variable pitch single or multiple-groove V-type sheave and the mechanism by means of which the pitch diameter of the sheave may be varied while it is in motion.

One of the objects of the invention is the provision of a comparatively simple, easily manufactured mechanism by means of which the opposed belt engaging flanges of the sheave may be moved in unison during rotation of the sheave.

A further object of the invention is the provision of means whereby the variable pitch sheave structure may be quickly, easily and accurately attached to a driving or driven shaft.

With these and other objects in view, as may appear from the accompanying specification, the invention consists of various features of construction and combination of parts, which will be first described in connection with the accompanying drawings, showing a variable speed power transmission of a preferred form embodying the invention, and the features forming the invention will be specifically pointed out in the claims.

In the drawings:

Figure 3 is a longitudinal section through the motivating sheave flange.

Figure 4 is an elevation of the motivating sheave flange.

Figure 5 is an elevation of an intermediate sheave flange.

Figure 6 is a cross section through an intermediate sheave flange taken on the line 6—6 of Figure 5.

Figure 7 is an elevation of another of the intermediate sheave flanges.

Figure 8 is a cross section taken on the line 8—8 of Figure 7.

Figure 1:
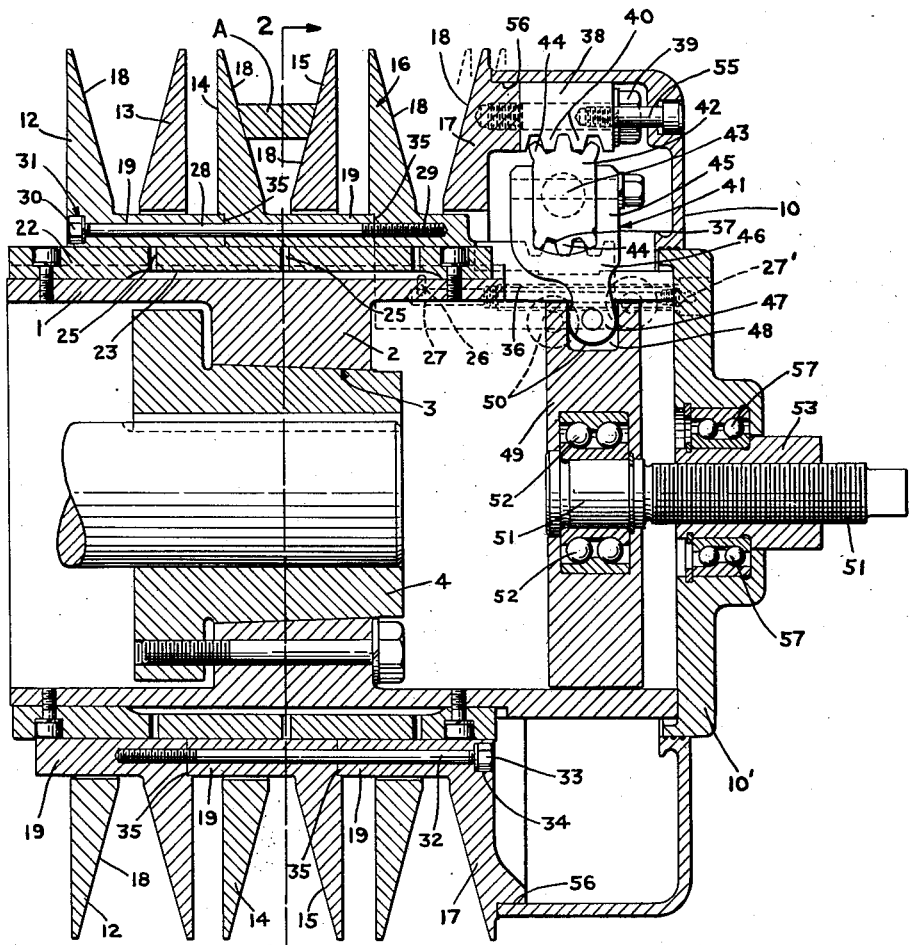
Figure 1 is a section through the improved variable pitch sheave structure with the upper half being a vertical section and the lower half of the view being a horizontal section, and taken on line 1—1 of Figures 2 and 9.
Figure 2:
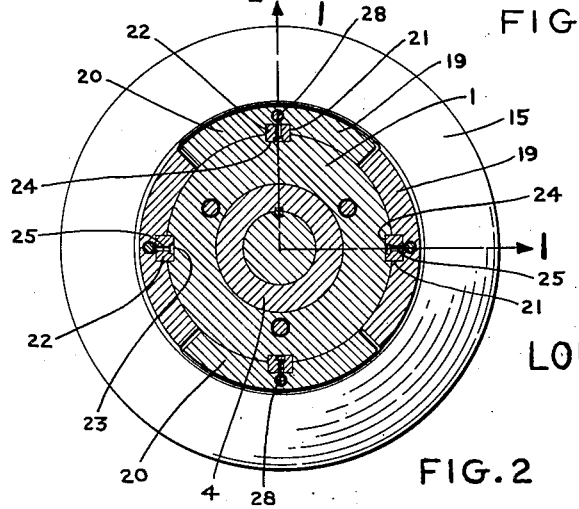
Figure 2 is a cross section through the sheave structure taken on the line 2—2 of Figure 1.
Figure 9:
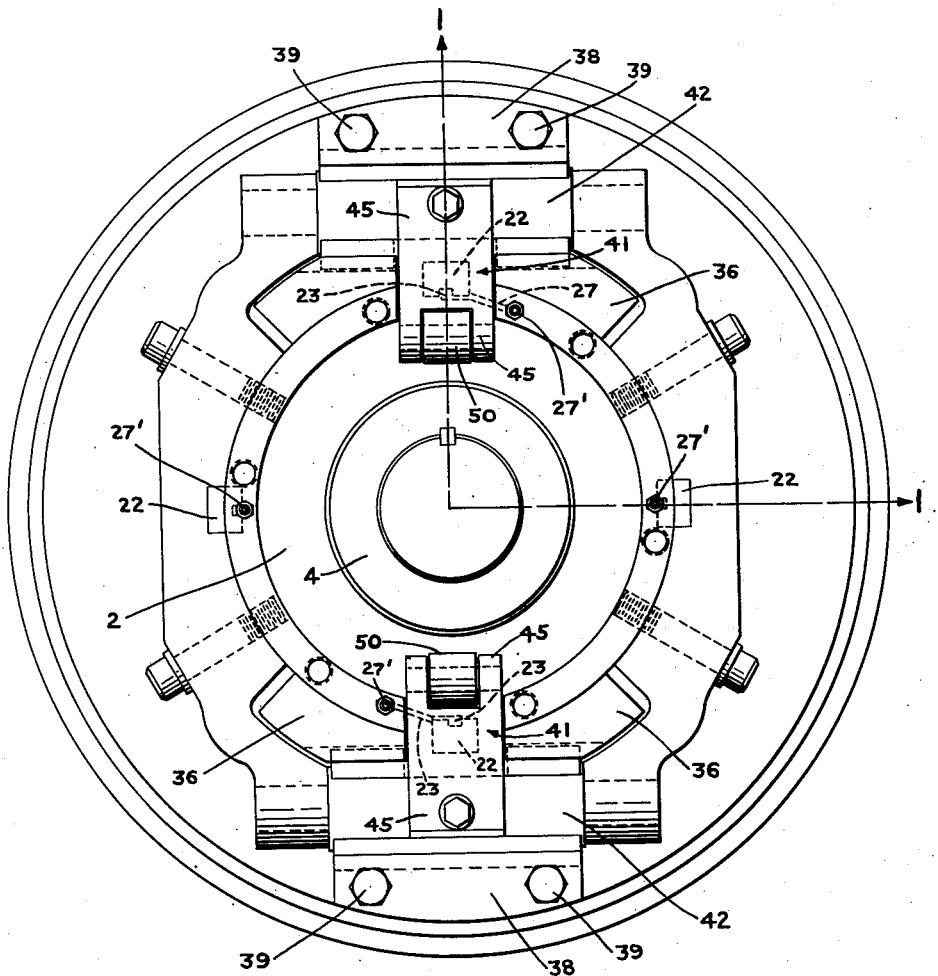
Figure 9 is an end view of the improved variable speed power transmission with the enclosing housing and adjusting block removed.

Referring more particularly to the drawings, the improved variable pitch V-groove sheave structure includes a main sleeve 1 which has the portion 2 intermediate its ends thickened to reduce the diameter of the bore of this intermediate section. The bore 3 of the section 2 is tapered, as clearly shown in Figure 1 of the drawings, for fitting the outer tapered surface of a quickly detachable hub structure 4. The quickly detachable hub structure 4 may be of any approved construction such as that disclosed in Patent No. 2,269,821 issued January 13, 1942. The quickly detachable hub structure 4 permits quick, easy and accurate attachment of the main sleeve 1 and consequently of the variable pitch sheave structure to either a driving or a driven shaft.

The main sleeve 1 has the sheave forming flanges 12, 13, 14, 15, 16, and 17 mounted thereon and arranged in opposed pairs with the angled face 18 of one flange facing the angled face of the adjacent flange to form the substantially V-shaped grooved sheaves over which the belts (not shown except one at A) travel. While in the drawings three pairs of sheave forming flanges are shown, it is to be understood that any number of pairs of such flanges may be employed without departing from the spirit of the invention.

All of the sheave flanges 12, 13, 14, 15, 16, and 17 have digitated sleeves 19 formed thereon that intermesh in pairs and bear directly upon the main sleeve 1. Each digitated sleeve 19 has two digitations 20 thereon and all of these digitations are provided with keyways 21 which receive keys 22 carried by the main sleeve 1 to prevent their rotation relative to the main sheave but permit them to be freely shifted axially of the sleeve 1.

The keys 22 are undercut for a part of their length as shown at 23 so as to form with the keyways 24 in the main sleeve 1, passages for flow of a lubricant. The lubricant flows from the passages formed by the undercut part of the keys through openings 25 in the keys 22 to lubricate the inner surfaces of the digitated sleeves 19 of the various flanges where they engage the main sleeve 1. The lubricant is delivered to the passages formed by the keyways 24 and undercut portions 23 through radiating passages 26 and a longitudinally extending passage 27 which opens out through the enclosing housing 19 as shown at 27'.

The flanges 12, 14 and 16 are connected by bolts 28 extending through the digitated sleeve portions of the flanges. The bolts 28 are threaded into the flange 16 as shown at 29 and have their heads 30 seated in counter bores 31 formed in the flange 12. The flanges 13, 15 and 17 are connected by bolts 32 which are threaded into the flange 13 and have their heads 33 seated in counter bores 34 formed in the flange 17.

The flanges 14 and 16 have annular recesses 35 cut in their flat faces which receive the extreme ends of the digitated sleeves of the flanges 12 and 14, respectively, and the flanges 13 and 15 have annular recesses 35 cut in their flat faces which receive the extreme ends of the digitated sleeves of the flanges 15 and 17 respectively, to provide interlocking of the flanges.

The flange 16 has an axially-extending actuating extension 36 formed thereon which is provided with a plurality of teeth 37 spaced to form, in effect, a rack, and the flange 17 has an actuating extension 38 attached thereto in any suitable manner such as by the bolt or bolts 39. The actuating extension 38 has a plurality of teeth 40 formed on its inner edge which are spaced to form a rack corresponding to the rack formed on the actuating extension 36.

An actuator structure 41 is provided for moving the flanges of each cooperating pair of flanges in unison and in opposite directions to vary the pitch diameter of the sheaves. This actuator structure 41 includes an actuating head 42, the opposite ends of which are arcuate, being cut from a definitely located predetermined center indicated at 43, and these arcuate ends have teeth 44 thereon which mesh with the teeth 37 and 40. The actuating head 42 is journaled at its ends and mounted for pivotal movement between the arms 45 of a yoke 46. The base arm 47 of the yoke 46 extends into a recess 48 formed in the actuating block 49. A roller 50 is carried by the base arm 47 of the yoke 46 for engagement with the sides of the recess 48.

The actuating block 49 is rotatably mounted upon an adjusting stem 51 for axial movement with adjustment of the stem and for the purpose of reducing friction. Roller or ball bearings 52 are placed between the actuating block 49 and the adjusting stem or screw 51. The adjusting stem or screw 51 is threadably mounted in a suitable adjusting block 53 so that by rotation of the adjusting screw 51 the actuating block 49 will be moved longitudinally of the axis of the main sleeve 1 and in so moving will rock or pivotally move the yoke 46, as indicated by the dotted line positions of the roller 50 in Figure 1 of the drawings. The pivotal movement of the yoke 46 and actuating head 42 will move the flange 16 and all of the corresponding flanges connected thereto by means of the bolts 28 in one direction and will move the flange 17 and all of the corresponding flanges connected thereto by means of the bolts 32 in the opposite direction for the purpose of varying the pitch diameters of the various sheaves formed by the cooperating pairs of flanges.

The housing 10 is attached to the actuating extension 38 by suitable bolts 55 with a portion of its perimeter seated in an annular recess 56 formed in the flange 17 and it encloses the actuating structure 41. The housing 10' is secured to the end of the main sleeve 1 by suitable bolts not shown, and is rotatable relative to the adjusting block 53, rotates with the flange 17, etc., and has roller or ball bearings 57 between it and the block 53 for reducing friction.

Either the block 53 or the adjusting screw 51 is held against rotation, for speed adjusting purposes.

It will be understood that the invention is not to be limited to the specific construction or arrangement of parts shown, but that they may be widely modified within the invention defined by the claims.

What is claimed is:

1. In a variable speed drive, a pair of axially movable cooperating sheave-forming flanges, an actuator including an actuating head and a carrying yoke, means for pivotally moving said yoke in a plane parallel to the axis of said flanges, means on said flanges intermeshing with said actuator head to move the flanges axially in opposite directions upon pivotal movement of said yoke.

2. In a variable speed drive, a pair of axially movable cooperating sheave-forming flanges, an actuator including an actuating head and a carrying yoke, means for pivotally moving said yoke in a plane parallel to the axis of said flanges, means on said flanges intermeshing with said actuator head to move the flanges axially in opposite directions upon pivotal movement of said yoke, an actuator block adjustable axially of said flanges, and means establishing connection between said yoke and said actuator block for pivotally moving said actuating head upon axial movement of said actuator block.

3. In a variable speed drive, a pair of axially movable cooperating sheave-forming flanges, an actuator including an actuating head and a carrying yoke, means for pivotally moving said yoke in a plane parallel to the axis of said flanges, opposed actuating extensions on said flanges, said actuating extensions and said actuating head provided with inter-engaging toothed sections for moving the flanges in opposite directions upon actuating movement of said actuating head, an actuator block adjustable axially of said flanges, and means establishing connection between said yoke and said actuator block for pivotally moving said actuating head upon axial movement of the actuator block.

4. In a variable speed drive, a main sleeve, an attaching hub detachably carried by said main sleeve for attaching the sleeve to a shaft, two cooperating sheave flanges slidably mounted on said main sleeve, digitated sleeves formed on said flanges and mounted on said main sleeve for axial movement thereon, means for keying the digitated sleeves of said flanges to said main sleeve for rotation therewith, an actuating extension on one of said flanges, an actuating extension on the other of said flanges, an actuator including an actuating head and a carrying yoke, means for pivotally moving said yoke in a plane parallel to the axis of said main sleeve, and means on said actuating extensions inter-engaging with said actuating head to move said flanges axially in opposite directions upon pivotal movement of said yoke.

5. In a variable speed drive, a main sleeve, an attaching hub detachably carried by said main sleeve for attaching the sleeve to a shaft, two cooperating sheave flanges slidably mounted on said main sleeve, digitated sleeves formed on said flanges and mounted on said main sleeve for axial movement thereon, means for keying the digitated sleeves of said flanges to said main sleeve for rotation therewith, an actuating extension on one of said flanges, an actuating extension on the other of said flanges, an actuator including an actuating head and a carrying yoke, and means on said actuating extensions inter-engaging with said actuating head to move said flanges axially in opposite directions upon pivotal movement of said yoke, an actuator block adjustable axially of said flanges, and means establishing connection between said yoke and said actuator block for pivotally moving said yoke and actuating head upon axial movement of said actuator block.

6. In a variable speed drive, a main sleeve, an attaching hub detachably carried by said main sleeve for attaching a sleeve to a shaft, two cooperating sheave flanges slidably mounted on said main sleeve, digitated sleeves formed on said flanges and mounted on said main sleeve for axial movement thereon, means for keying the digitated sleeves to said main sleeve for rotation therewith, an actuating extension on one flange, an actuator including an actuating head mounted between said actuating extension and one digitation of the mating flange, inter-engaging means on said actuating extension, said one digitation and said actuating head whereby the flanges will be moved in opposite directions upon pivotal movement of the actuator, a housing attached to said actuating extension and enclosing said actuator, and an adjusting screw carried by and rotatable independently of said housing and adjustable axially relative to the housing for pivotally moving said actuator.

7. In a variable speed drive, a main sleeve, an attaching hub detachably carried by said main sleeve for attaching a sleeve to a shaft, two cooperating sheave flanges slidably mounted on said main sleeve, digitated sleeves formed on said flanges and mounted on said main sleeve for axial movement thereon, means for keying the digitated sleeves to said main sleeve for rotation therewith, an actuating extension on one flange, an actuator including an actuating head mounted between said actuating extension and one digitation of the mating flange, inter-engaging means on said actuating extension, said one digitation and said actuating head whereby the flanges will be moved in opposite directions upon pivotal movement of the actuator, a housing attached to said actuating extension and enclosing said actuator, an actuating block adjustable axially of the housing, said actuator and said actuating block interconnected whereby said actuator will be pivotally moved relative to the actuator block upon axial movement of the actuator block.

LOUIS EATON SHAW.

REFERENCES CITED

The following references are of record in the file of this patent:

UNITED STATES PATENTS

| Number | Name | Date |
|---|---|---|
| 2,262,197 | Otto | Nov. 11, 1941 |
| 2,269,821 | Kemphert | Jan. 13, 1942 |

FOREIGN PATENTS

| Number | Country | Date |
|---|---|---|
| 462,625 | Great Britain | Mar. 12, 1937 |